United States Patent
Kalisvaart et al.

(10) Patent No.: US 12,355,074 B2
(45) Date of Patent: Jul. 8, 2025

(54) TIN ALLOY SHEETS AS NEGATIVE ELECTRODES FOR NON-AQUEOUS Li AND Na-ION BATTERIES

(71) Applicant: Nanode Battery Technologies Ltd., Edmonton (CA)

(72) Inventors: Willem Peter Kalisvaart, Edmonton (CA); Sayed Youssef Sayed Nagy, Troy, MI (US); Jillian Mary Buriak, Edmonton (CA); Bing Cao, Edmonton (CA)

(73) Assignee: Nanode Battery Technologies Ltd., Edmonton (CA)

( * ) Notice: Subject to any disclaimer, the term of this patent is extended or adjusted under 35 U.S.C. 154(b) by 47 days.

(21) Appl. No.: 17/677,738

(22) Filed: Feb. 22, 2022

(65) Prior Publication Data

US 2022/0293924 A1    Sep. 15, 2022

Related U.S. Application Data

(60) Provisional application No. 63/161,018, filed on Mar. 15, 2021.

(51) Int. Cl.
  *H01M 4/38* (2006.01)
  *H01M 4/04* (2006.01)
  *H01M 4/02* (2006.01)

(52) U.S. Cl.
  CPC ......... *H01M 4/387* (2013.01); *H01M 4/0435* (2013.01); *H01M 2004/027* (2013.01)

(58) Field of Classification Search
  CPC .......... H01M 4/04; H01M 4/38; H01M 4/387; H01M 4/36; H01M 10/0525
  See application file for complete search history.

(56) References Cited

U.S. PATENT DOCUMENTS

| | | | | |
|---|---|---|---|---|
| 6,030,472 A | * | 2/2000 | Hajaligol | C21D 8/0205 419/29 |
| 6,964,826 B2 | * | 11/2005 | Ovshinsky | H01M 4/885 420/451 |
| 7,767,349 B2 | | 8/2010 | Obrovac et al. | |
| 7,851,085 B2 | | 12/2010 | Obrovac et al. | |
| 8,911,901 B2 | | 12/2014 | Nakabayashi et al. | |
| 10,476,072 B2 | | 11/2019 | Friend et al. | |
| 2006/0046144 A1 | * | 3/2006 | Obrovac | C22C 5/08 429/231.95 |

(Continued)

OTHER PUBLICATIONS

Zhang et al., "Improved sodium-ion storage properties by fabricating nanoporous CuSn alloy architecture", RSC Adv, 2017, 7, 29458. Mar. 31, 2017.*

(Continued)

*Primary Examiner* — Kenneth J Douyette
(74) *Attorney, Agent, or Firm* — Eugene Gierczak (57) ABSTRACT

This invention relates to materials for the negative electrode in non-aqueous rechargeable alkali-ion batteries in freestanding form. In particular, this invention relates to the use of metal ribbon that is produced by melt spinning directly as a battery electrode. The invention also relates to a method producing a highly dispersed, multiphase composite material in a single step, as well as a way to generate porosity while maintaining the 'binder-free' and 'additive-free' characterization of the electrode.

12 Claims, 9 Drawing Sheets

(56) References Cited

U.S. PATENT DOCUMENTS

2013/0295464 A1* 11/2013 Yanagi .................. H01M 4/136
  429/231.9

OTHER PUBLICATIONS

Wijayanti et al., "The electrochemical performance of melt-spun C14-Laves type TiZr-based alloy", International Journal of Hydrogen Energy, 2020, 45 (2), pp. 527-537.*

Article entitled "Morphology-controlled Synthesis of Nanoporous-antimony Anode for High-performance Sodium-ion Batteries" Energy & Environmental Science Accepted Manuscript pp. 2-29 Royal Society of Chemistry; www.rsc.org/ees DOI: 10.1039/C5EE03699B (liu2016).

Article entitled "Morphology- and Porosity-Tunable Synthesis of 3D Nanoporous SiGe Alloy as a High-Performance Lithium-Ion Battery Anode" ACS Nano, Just Accepted Manuscript DOI: 10.1021/acsnano.8b00426 Publication Date (Web): Mar. 12, 2018 pp. 1-31 http://pubs.acs.org on Mar. 13, 2018 (yang2018) ACS Nano 2018, 12, pp. 2900-2908; DOI: 10.1021/acsnano.8b00426 (acsnano.8b00426).

Article entitled "Microstructure Controlled Porous Silicon Particles as a High Capacity Lithium Storage Material via Dual Step Pore Engineering" Advanced Science News Adv. Funct. Mater. 2018, 1800855, pp. 1-8; DOI: 10.1002/adfm.201800855 (sohn2018).

Article entitled "Bimodal nanoporous NiO@Ni-Si network prepared by dealloying method for stable Li-ion storage" Journal of Power Sources, pp. 1-10; Zhifeng Wang, Journal of Power Sources, https://doi.org/10.1016/j.jpowsour.2019.227550 (10.1016@j.jpowsour.2019.227550).

Article entitled "Porous carbon-free SnSb anodes for high-performance Na-ion batteries" Journal of Power Sources 386 (2018) 34-39; https://doi.org/10.1016/j.jpowsour.2018.03.032 (choi2018).

Article entitled "A self-healing Sn anode with an ultra-long cycle lifefor sodium-ion batteries" J. Mater. Chem. A, 2018, 6, 22809-22818, DOI: 10.1039/c8ta09544b; The Royal Society of Chemistry 2018 (kim2018).

* cited by examiner

TIN ALLOY SHEETS AS NEGATIVE ELECTRODES FOR NON-AQUEOUS Li AND Na-ION BATTERIES

FIELD OF INVENTION

The present invention relates to novel materials for the negative electrode in non-aqueous rechargeable alkali-ion batteries in free-standing form. In particular, this invention relates to the use of metal ribbon that is produced by melt spinning directly as a battery electrode. The invention also relates to a method producing a highly dispersed, multiphase composite material in a single step, as well as a way to generate porosity while maintaining the 'binder-free' and 'additive-free' characterization of the electrode.

BACKGROUND AND PRIOR ART

Due to their high energy density and long lifetime, alkali-ion (Lithium or sodium) batteries using organic electrolytes are widespread in consumer electronics and electric vehicles. Potentially, they can also be deployed in grid-scale energy storage units for load leveling when renewable, but intermittent, energy sources such as wind and solar become ever more widespread. However, to make electric vehicles and large-scale energy storage truly cost-competitive, production costs need to come down further and the capacity and energy density need to be increased.

Conventional electrode manufacturing consists of mixing the active material with a small quantity of conductive additive and a binder, which together usually make up around 5 wt % of the total weight, followed by blade-coating the resulting mixture onto a copper current collector. Commonly used binders are polyvinylidene fluoride (PVDF) and carboxymethyl cellulose (CMC), which require organic solvents and water, respectively, to make the electrode mixture. Organic solvents need to be completely recovered from the electrode drying process due to environmental regulations whereas completely removing water from a porous electrode is very energy-intensive. If the slurry coating and drying steps could somehow be circumvented, the entire manufacturing process would be simpler and cheaper. Commonly used terms are 'binder free' and 'additive free' to denote the lack of polymeric binder and conductive carbon additive, respectively.

In the absence of binder and conductive additive, an inert metal phase can fulfill the same roles, forming a conductive pathway and reinforcing the structure. If the active material itself is intrinsically electronically conductive as well as ductile, it can be sufficiently resistant to fracture to cycle all by itself, as a free-standing electrode sheet. However, some porosity in the as-made electrode is preferred, as this porosity allows for penetration by the liquid electrolyte, enabling fast ion transport and shorter solid-state diffusion distances of Li or Na through the active material. In a powder composite electrode, porosity and an interpenetrating electrical pathway emerge naturally, but when the electrode contains only the active material, additional efforts need to be made. The present invention describes a way to achieve all these objectives by producing a highly dispersed, multiphase composite material in a single step, as well as a way to generate porosity while maintaining the 'binder-free' and 'additive-free' characterization of the electrode.

Tin is a high-capacity anode material for both Li-ion and Na-ion battery anodes. Compared to graphite (372 mAh/g, but limited to ~330 mAh/g in practice), it has almost 3 times higher capacity for Li-ion (960 mAh/g) and more than 3 times the capacity of the benchmark anode material for Na-ion batteries, so-called 'hard' carbon, at 250 vs 847 mAh/g. Moreover, the volumetric capacity of graphite and hard carbon, 743 mAh/cm3 and ~425 mAh/cm3, respectively, calculated by multiplying the specific capacity in mAh/g by the density in g/cm3, are already exceeded at much lower capacities thanks to the high mass density of Sn, 7.3 g/cm3 vs. 2.25 for graphite, ~1.7 for hard carbon. A capacity of only 140 mAh/g Sn needs to be reached to improve upon the volumetric capacity of graphite in LIBs and 80-90 mAh/g to improve upon hard carbons in SIBs, after taking the material expansion of Tin into account. The high ductility of Sn, particularly in comparison to the most intensively researched high-capacity anode material, silicon (3578 mAh/g, 2243 mAh/cm$^3$), makes it much less prone to fracture. Indeed, when cycled in ether-based electrolyte, Sn powder electrodes have an extremely long cycle life as SIB anodes, spontaneously evolving a more refined, higher-porosity nanostructure over the course of cycling. [see "A self-healing Sn anode with an ultra-long cycle life for sodium-ion batteries", DOI: 10.1039/C8TA09544B] The present invention takes advantage of this property by using pure Sn as the anode active material and introducing an inert phase in a single-step, or a certain amount of porosity by dissolving the secondary phase after the active material has been prepared.

Melt spinning is a metal forming technique that is typically used to form thin ribbons of metal or alloys with a particular atomic structure. More particularly, the melt spinning process comprises one embodiment where one or more constituent metals are melted together in a reservoir with a narrow slit at the bottom. After all the material has melted, it is expelled using inert gas pressure onto a fast-rotating copper wheel with a very high thermal mass compared to the amount of material. As a result, extremely high cooling rates are achieved and the resulting degree of dispersion in multi-phase materials is far higher than traditional casting methods. The final product is in the form of a long, continuous ribbon, that can be used directly as an electrode. The materials can also be re-processed by cold-rolling into thin sheets with any aspect ratio to conform to the size and shape of the battery they will be used in. Thanks to the high cooling rates achieved using the melt spinning process, the inert secondary phase becomes very finely distributed throughout the material.

Addition of copper to Sn and processing the mixture by melt spinning results in formation of a Cu6Sn5 ('bronze') phase. Addition of aluminum, which is not reactive with Sn, also achieves a very fine dispersion of elemental Al throughout the active Sn phase, thus serving its purpose as structural support and electron conductive pathway. The resulting material can be used directly in a LIB or SIB cell as an anode. Alternatively, the Al can be dissolved in a potassium hydroxide solution, resulting in a network of pores throughout the active material enabling easy access by the electrolyte.

Using melt spinning as a way to produce (porous) active materials for LIBs and SIBs and even potassium-ion batteries has become more common in recent years. Examples include "The morphology-controlled synthesis of a nanoporous-antimony anode for high-performance sodium-ion batteries", DOI: 10.1039/C5EE03699B, "Morphology- and Porosity-Tunable Synthesis of 3D Nanoporous SiGe Alloy as a High-Performance Lithium-Ion Battery Anode", DOI: 10.1021/acsnano.8b00426, "Microstructure Controlled Porous Silicon Particles as a High Capacity Lithium Storage Material via Dual Step Pore Engineering", DOI: 10.1002/ adfm.201800855, "Bimodal nanoporous NiO@Ni—Si network prepared by dealloying method for stable Li-ion storage", DOI:10.1016/j.jpowsour.2019.227550, "Porous carbon-free SnSb anodes for high-performance Na-ion batteries", DOI: 10.1016/j.jpowsour.2018.03.032. What all these have in common is that after the melt spinning and etching steps, the resulting material is used for the common powder mixing and slurry coating steps used in commercial battery-making processes today.

Using Sn-rich Sn—Al and Sn—Zn—Al metal sheets directly as LIB anodes is discussed in "Interdigitated Eutectic Alloy Foil Anodes for Rechargeable Batteries" DOI: 10.1021/acsenergylett.7b00844 but these are made by traditional casting methods and no attempts were made to introduce porosity into the material.

U.S. patent Ser. No. 10/476,072 "Electrodes for metal ion batteries" describes a method of producing porous Si and Sn powder using a chemical etching method. Melt spinning is mentioned as a possible way of producing the original composite, but here too, the end goal was to use the material in a classical powder mixing and electrode coating process. U.S. Pat. No. 8,911,901 "Negative electrode for non-aqueous secondary battery and non-aqueous secondary battery" describes preparation of a porous Si or Sn-based two-phase material using melt spinning, but the porosity occurs naturally and no chemical etching is used. Electrode preparation is done using powder processing.

U.S. Pat. Nos. 7,767,349 and 7,851,085 "Alloy compositions for lithium-ion batteries" describe multi-component Si—Sn—Al-TransitionMetal-RareEarth alloys for use as LIB anodes using powder processing for electrode preparation.

SUMMARY OF THE INVENTION

The present invention uses the thin metal ribbon that is produced by the melt spinning process directly as a battery electrode, without the need for powder processing. Using a spin speed of 30-45 Hz, corresponding to a surface velocity of 28.27 to 42.4 m/s, the gap between the bottom of the crucible and the rotating copper wheel was set to between 0.25 and 0.4 mm at the moment the molten material was ejected. The overpressure on top of the melt used to expel the molten material from the crucible and onto the copper wheel was between 0.2 and 0.4 atmosphere. Ribbons between 20 and 45 micrometer thickness and 1 cm wide are produced in this manner. Thanks to the extremely high cooling rates achieved in a melt spinning process, the secondary phase, when there is one, is very finely dispersed throughout the material. Composite Sn—Cu and Sn—Al ribbons can be produced in this way where the Cu6Sn5 (bronze) and Al metal inclusions have maximum dimensions below 1 micron and below 250 nm, respectively. Preferably, the Al content in Sn—Al is between 0 and 50 atomic %. After optional densification of the Sn—Al ribbon by cold rolling to improve mechanical strength during the leaching step, alkaline leaching of the Al using potassium hydroxide solution introduces pores into the Sn ribbon that can then still be used as a battery anode in the form of a sheet, rather than powder. The porosity is equal to the volume fraction of Al in the original alloy ribbon; between 0 and 38% for 0 and 50 at % Al, respectively.

Advantages of the Invention

The entire electrode preparation process is much simpler as it completely circumvents powder processing. Our melt spun Cu30Sn70 (atomic percent) shows stable cycling as a SIB anode at a capacity that is far beyond so-called hard-carbon (~250 mAh/g) materials that are often applied as SIB anodes. Compared to dense Sn, composite Sn—Al and porous Sn ribbons show a strongly reduced tendency to fracture during lithiation/delithiation or sodiation/desodiation cycling. The porosity resulting from Al leaching helps to accommodate material expansion during lithiation and sodiation. A porous Sn ribbon is more efficient at extracting Li compared to solid Si—Al when cycled at a capacity equivalent to a commercial graphite anode including its copper current collector (200 mAh/g).

These and other objects and features of the invention shall now be described in relation to the following drawings.

DETAILED DESCRIPTION OF THE INVENTION

The description herein utilizes nomenclature found in texts. During discharge the positive is a cathode, the negative is an anode. During charge the positive is an anode, the negative is a cathode. Texts describing battery anodes or cathodes imply considering the case of a discharge.

In addition, the starting materials that are used in the invention to be described utilize materials available in the market place that may have impurities or trace amounts of other materials. For example, in one embodiment the Sn powder described herein has a purity of at least 99.5%. The Al is at least 99.7% pure.

Figure 1:
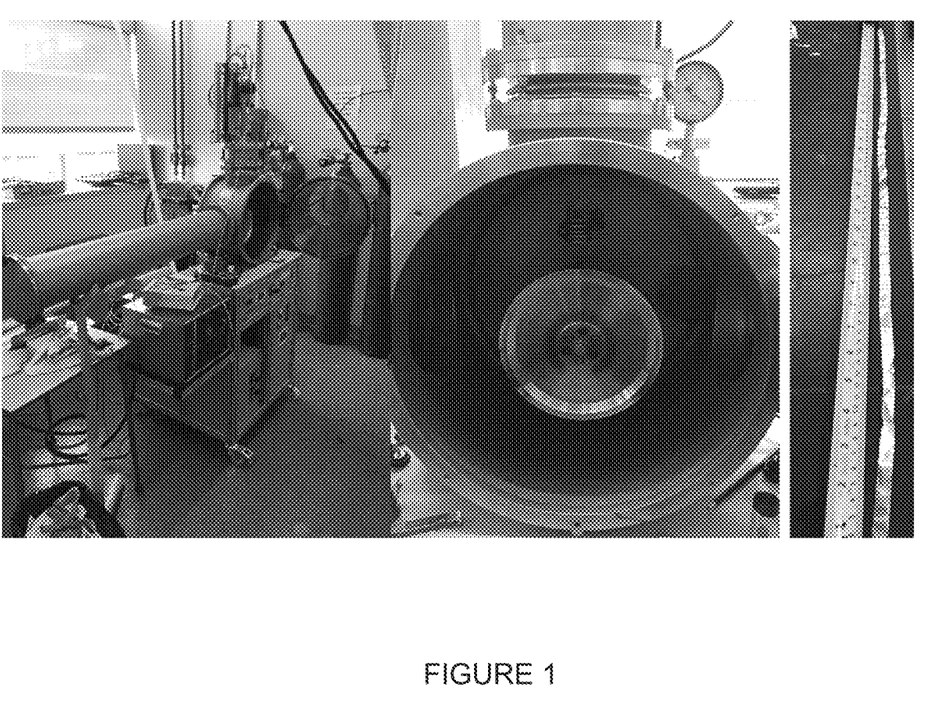
FIG. 1 is a photo of the melt spinning apparatus.

Explanation of Terms
  LIB: Lithium ion battery
  SIB: Sodium ion battery
  Anode: Negative electrode in full-cell configuration
  Cathode: Positive electrode in full-cell configuration
  Half-cell: Battery containing the active material, subject of the present invention, as the positive electrode and Li or Na metal as the negative electrode
  Full cell: Battery containing the materials described herein as the negative electrode and lithium or sodium transition metal oxides as the positive electrode
  Coin cell: Most commonly used battery format in laboratory research mAh/g (milli-Ampere-hours-per-gram): Unit of capacity of an active electrode material. 1 mAh is equal to 3.6 Coulombs
  Coulombic efficiency: Amount of Li extracted/Amount of Li inserted into an electrode FIG. 1 is a photo of the meltspinning apparatus showing the copper wheel. In one embodiment a boron nitride crucible filled with the starting materials (Sn and Cu or Al) is positioned in the middle of the RF induction coil that is visible above the copper wheel. When a temperature of at least 200 degrees above the liquidus, as read from a phase diagram, is reached, the crucible is lowered to a position 0.25-0.4 mm above the wheel and the molten material is ejected onto the rapidly spinning copper wheel, producing a long ribbon. Also shown is a long length of unbroken ribbon that is formed by the melt spinning process.

Figure 2A:
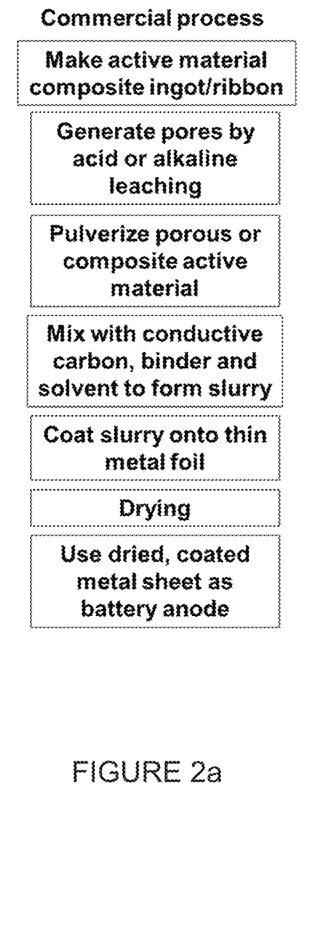
FIG. 2a is a schematic overview of a Prior Art commercial electrode preparation processes; as compared to FIG. 2b, which is a schematic flow chart that shows an overview of the invention described herein.
Figure 2B:
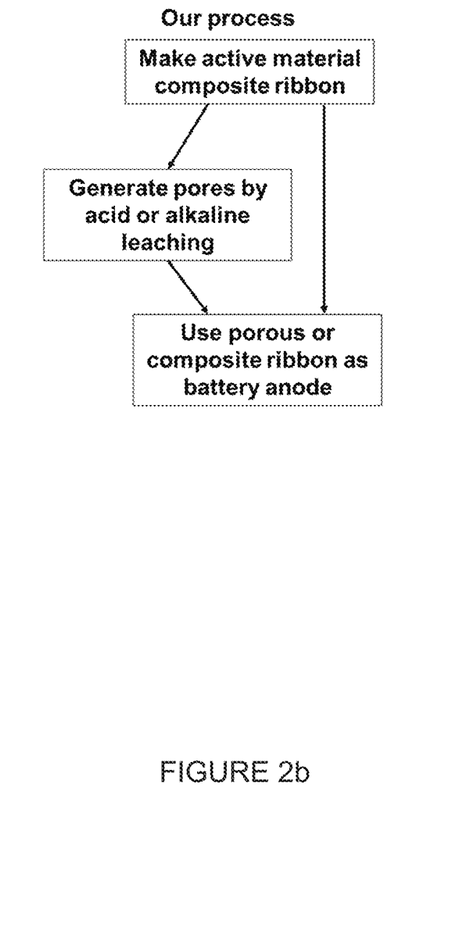

FIG. 2a is a schematic overview of a prior art commercial electrode preparation processes; while FIG. 2b is a schematic flow chart that shows an overview of the invention described herein. One advantage of using the process described herein lies in the fact that, all the powder mixing, coating and drying steps, which are highly time- and energy-consuming, can be circumvented.

Figure 3:
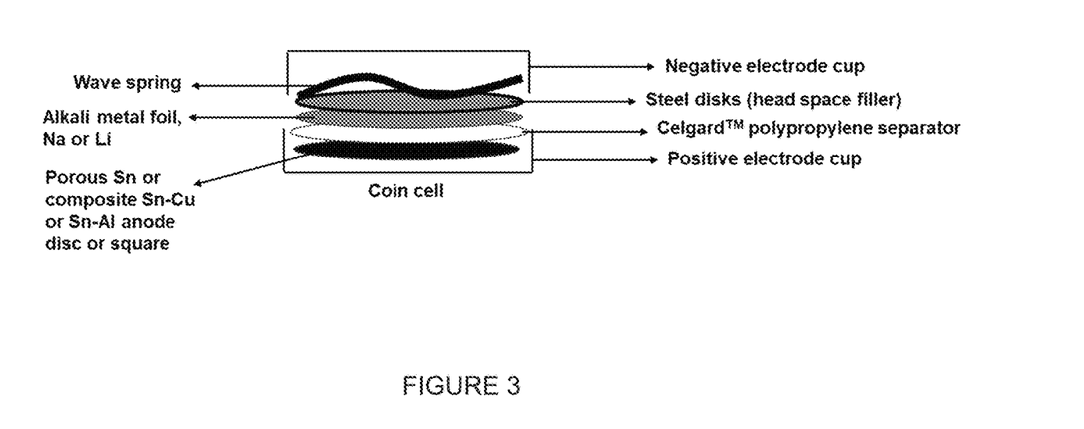
FIG. 3 is a schematic drawing of a coin cell that was used for electrochemical testing. Half-cell configuration is depicted using a Na or Li metal negative electrode.

FIG. 3 is a schematic drawing of the coin cell that was used for electrochemical testing. A cross section or half-cell configuration is depicted using a Na or Li metal negative electrode. The alkali metal foil is separated from the working electrode by a porous polypropylene (Celgard™) separator. The porous Sn or composite Sn—Al or Sn—Cu anode is contacting the positive electrode cup. The top surface of the Sn-based anode and both sides of the separator are wetted with electrolyte before the cell is crimped shut. The strips are cut into 1 cm² squares with scissors or 1 cm diameter discs using a die cutter to fit inside the '2032' (20 mm diameter, 3.2 mm height) coin cells (see FIG. 3) that were used for electrochemical cycle life testing.

Figure 4A:
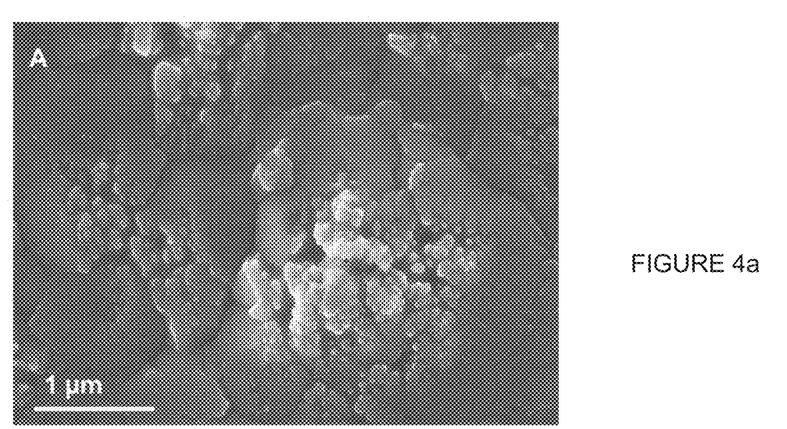
FIG. 4a is an SEM micrograph and FIGS. 4b and 4c are EDX elemental mappings of Sn and Cu of a Cu30Sn70 ribbon melt spun at a wheel rotation frequency of 30 Hz, gap between the wheel and crucible of 0.25 mm and ejection pressure differential of 0.2 bar.
Figure 4B:
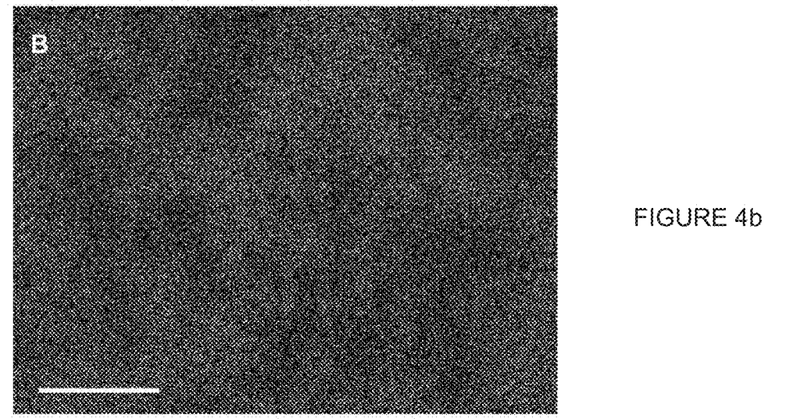
Figure 4C:
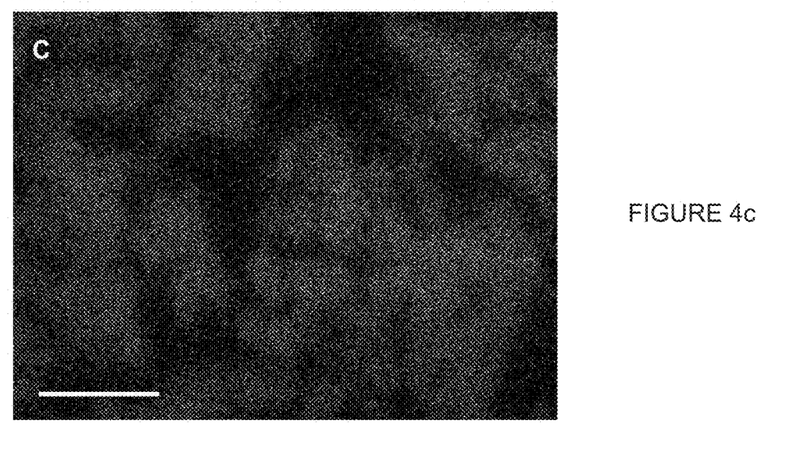

FIG. 4a is a scanning electron microscope (SEM) micrograph and FIGS. 4b and 4c are energy-dispersive X-ray spectroscopy (EDX) elemental mappings of Sn and Cu respectively of a Cu30Sn70 ribbon meltspun at a wheel rotation frequency of 30 Hz, gap between the wheel and crucible of 0.25 mm and ejection pressure differential of 0.2 bar. The scalebar is 1 micrometer in all three micrographs. The composition is given in atomic percent.

Figure 5A:
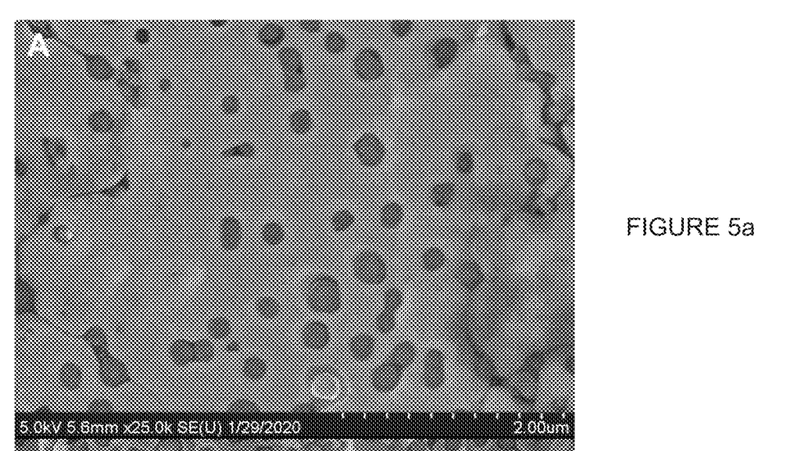
FIGS. 5a, 5b, and 5c show SEM micrographs of (from top to bottom) Sn75Al25, Sn65Al35 and Sn50Al50 ribbons melt spun at a wheel rotation frequency of 30 Hz, a gap between the wheel and the crucible of 0.25 mm and an ejection pressure differential of 0.2 bar
Figure 5B:
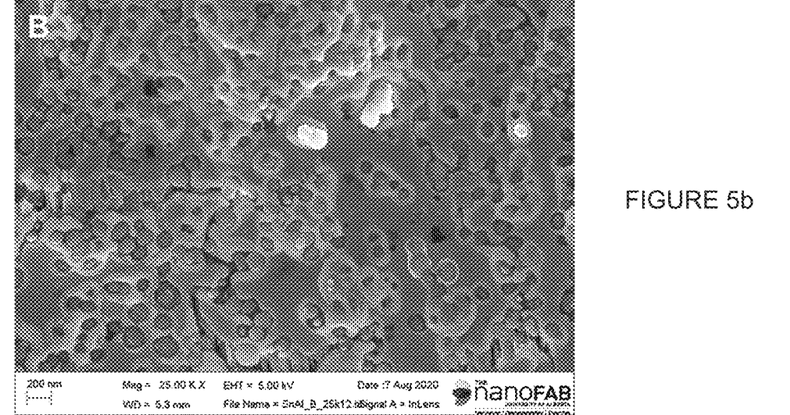
Figure 5C:
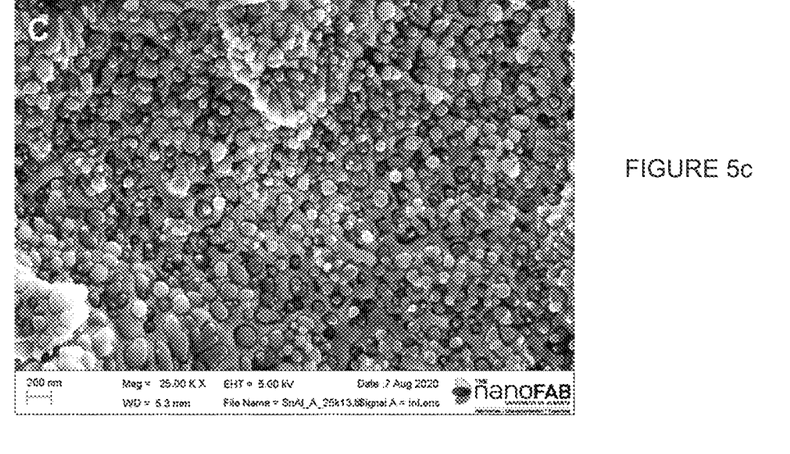

FIGS. 5a, 5b, and 5c are SEM micrographs of (from top to bottom) Sn75Al25, Sn65Al35 and Sn50Al50 respectively of ribbons melt spun at a wheel rotation frequency of 30 Hz, gap between the wheel and crucible of 0.25 mm and ejection pressure differential of 0.2 bar. The compositions are given as atomic percentages. The aluminum particles are all smaller than 250 nm.

Figure 6A:
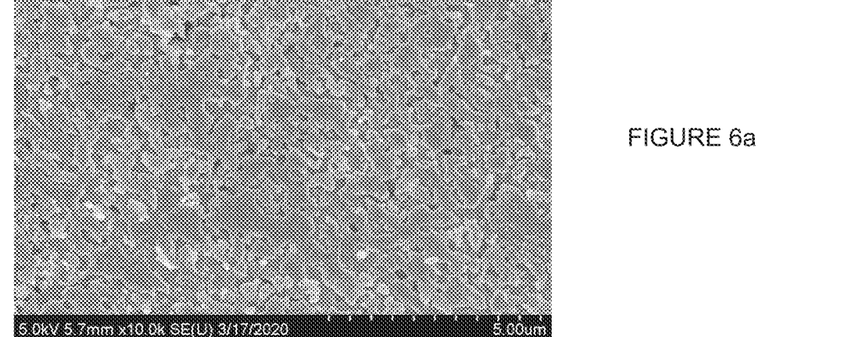
FIGS. 6a, 6b, and 6c show the same ribbons as FIGS. 5a, 5b, and 5c in the same order, after dissolving all the Al in 1 M (aq) KOH solution resulting in a porous Sn structure
Figure 6B:
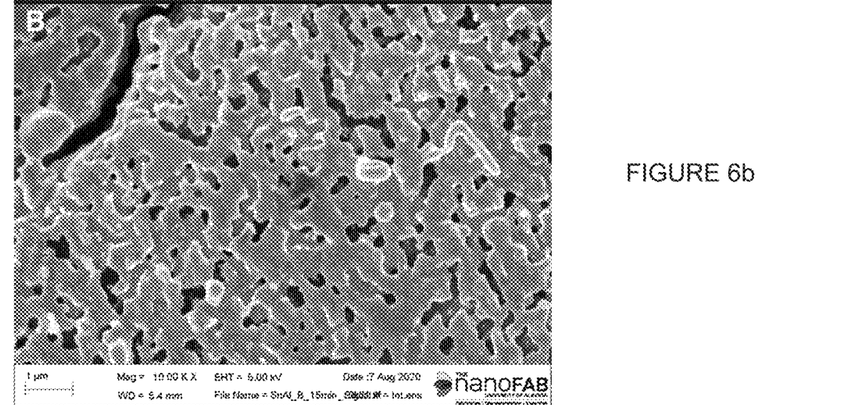
Figure 6C:
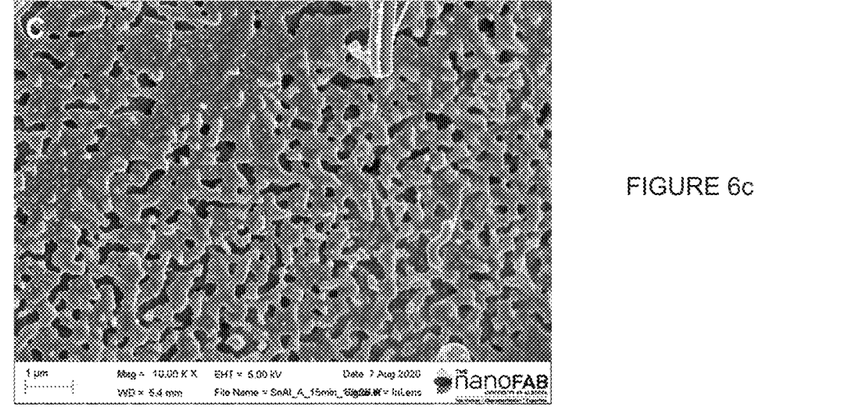

FIGS. 6a, 6b, and 6c show the same ribbons as in FIGS. 5a, 5b, and 5c respectively in the same order, after dissolving all the Al in 1 M KOH solution resulting in a porous Sn structure. The interconnected Sn filaments are visible in the micrographs as well as the voids left behind after the Al is dissolved.

Figure 7A:
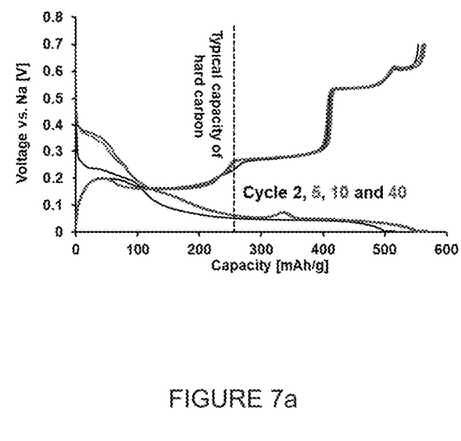
FIG. 7a shows the voltage profiles of a Cu30Sn70 ribbon cycled in SIB half-cell configuration using 1 M NaPF6 in dimethoxyethane (DME) as the electrolyte. The dashed line demarcates the capacity of a typical hard carbon material. Capacity and Coulombic efficiency (CE) as a function of cycle number are shown in FIG. 7b. CE is consistently above 99%.

FIG. 7a shows the voltage profiles of a Cu30Sn70 ribbon cycled in SIB half-cell configuration using 1 M NaPF6 in dimethoxyethane (DME) as the electrolyte. The dashed line in FIG. 7b demarcates the capacity of a typical hard carbon material at 250 mAh/g. The Cu30Sn70 ribbon cycles at more than twice that capacity; 560 mAh/g. Capacity and Coulombic Efficiency (CE) as a function of cycle number are shown on the right. CE is consistently above 99%

Figure 7B:
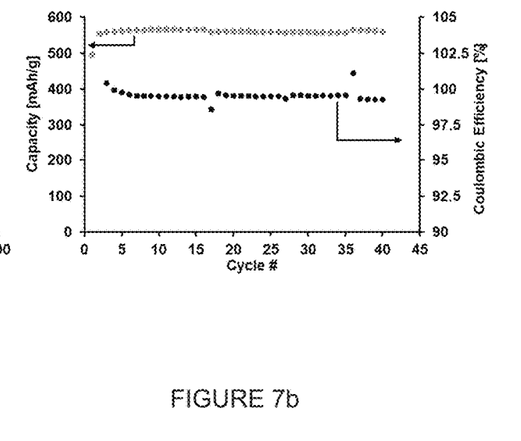

More particularly FIG. 7 shows that a 1 cm² Cu30Sn70 anode cut directly from an as-produced melt spun ribbon can be stably cycled at more than twice the capacity of hard carbon, which is a typically used anode material in sodium-ion batteries.

Figure 8A:
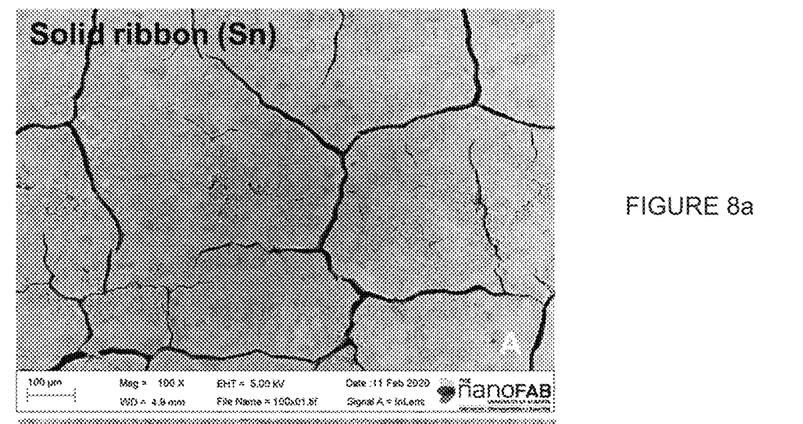
FIGS. 8a, 8b, and 8c show SEM micrographs of solid Sn, composite Sn75Al25 and etched, porous Sn75Al25 after 200 cycles as a SIB anode at the same capacity showing progressively less fracturing going from solid elemental Sn to porous Sn.
Figure 8B:
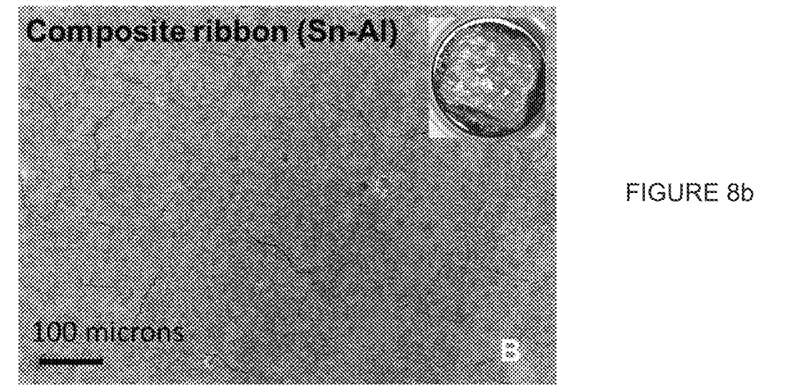
Figure 8C:
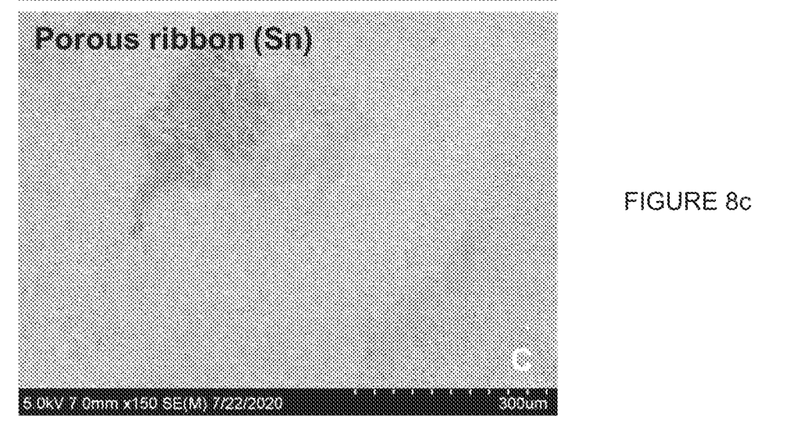

FIGS. 8a, 8b, and 8c show SEM micrographs of solid Sn (FIG. 8a), composite Sn—Al (FIG. 8b) and etched, porous Sn—Al (FIG. 8c) after 200 cycles as a sodium-ion battery anode at the same capacity showing progressively less fracturing going from solid elemental Sn to porous Sn, emphasizing the beneficial effect of the composites and porous anode material, described herein respectively, over a dense material. More particularly FIG. 8 shows the beneficial effects of using composite or porous Sn. The amount of fracturing diminishes continuously moving from a pure, solid (i.e. no pores) Sn ribbon in FIG. 8a, to a composite Sn—Al ribbon used directly as it is produced by the melt spinning process and cut to size (FIG. 8b) and a porous Sn ribbon produced by dissolving the Al from a Sn—Al composite ribbon (FIG. 8c). This emphasizes the beneficial effects of using composite and porous anode material, respectively.

Figure 9A:
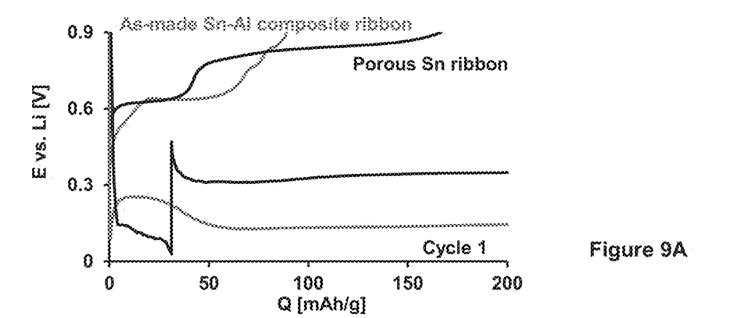
FIG. 9a shows the voltage profiles in the first cycle of as-made Sn75Al25 and porous etched Sn75Al25 cycled in a LIB half cell in 1 M LiPF6 in a 1:1 by volume ethylene carbonate:diethyl Carbonate (EC:DEC) electrolyte containing 10 volume % fluoroethylene carbonate (FEC) Coulombic efficiency (CE) as a function of cycle number are shown in FIG. 9b. Efficiency in the early cycles is much better for the porous material. CE is consistently above 99.5%.
Figure 9B:
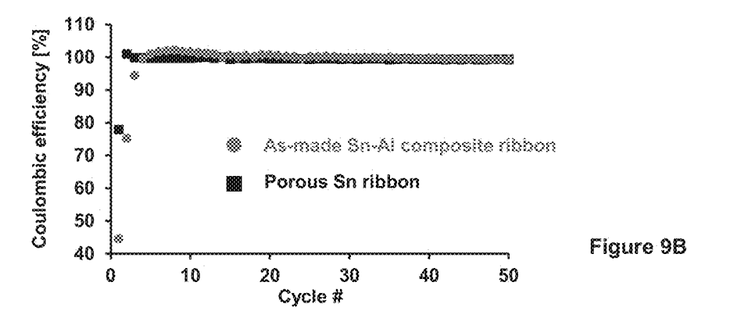

FIG. 9a shows the voltage profiles in the first cycle of as-made Sn—Al composite and porous etched Sn—Al composite cycled in a LIB half cell in 1 M LiPF6 in a 1:1 by volume ethylene carbonate:diethyl carbonate (EC:DEC) electrolyte containing 10 volume % fluoroethylene carbonate (FEC). Coulombic Efficiency (CE) as a function of cycle number are shown on the bottom in FIG. 9b. Coulombic Efficiency in the early cycles is much better for the porous material, which extracts 78% of the inserted Li in the first cycle vs. 45% for the composite. CE is consistently above 99.5% for both after the $3^{rd}$ cycle. Furthermore FIG. 9 shows that in a lithium-ion coin cell, the porous Sn has better reversibility in the first cycle compared to the composite ribbon; 78% vs. 45%, again emphasizing the advantages of generating the internal porous structure in the Sn. Both cells can cycle at close-to-100% efficiency for at least 50 cycles.

The present invention uses the thin metal ribbon that is produced by the melt spinning process directly as a battery electrode, without the need for powder processing. Using a spin speed of 30-45 Hz, corresponding to a surface velocity of 28.27 to 42.4 m/s. The gap between the bottom of the crucible and the rotating copper wheel was set to between 0.25 and 0.4 mm at the moment the molten material was ejected. The overpressure on top of the melt used to expel the molten material from the crucible and onto the copper wheel was between 0.2 and 0.4 atmosphere. Ribbons between 20 and 45 micrometer thickness and 1 cm wide are produced in this manner. Thanks to the extremely high cooling rates achieved in a melt spinning process, the secondary phase, when there is one, is very finely dispersed throughout the material. Composite Sn—Cu and Sn—Al ribbons can be produced in this way where the Cu6Sn5 (bronze) and Al metal inclusions have maximum dimensions below 1 micron and below 250 nm, respectively. Preferably, the Al content in Sn—Al is between 0 and 50 atomic %. After optional densification of the Sn—Al ribbon by cold rolling to improve mechanical strength during the leaching step, alkaline leaching of the Al using potassium hydroxide solution introduces pores into the Sn ribbon that can then still be used as a battery anode in the form of a sheet, rather than powder. The porosity is equal to the volume fraction of Al in the original alloy ribbon; between 0 and 38% for 0 and 50 at % Al, respectively.

What is claimed is:

1. A method of producing a battery electrode comprising:
   a) spinning a metal ribbon on a melt spinning apparatus; to directly produce a ribbon of Sn alloy or composite material of Sn and at least one of Al and Cu between 20 and 45 micrometer thickness as the battery electrode without powder processing.

2. The method as claimed in claim 1 further comprising:
   a) setting a spin speed between a surface velocity of between 20 to 50 m/s;
   b) selecting a rotating copper wheel with a crucible;
   c) selecting Sn and Cu or Sn and Al as metal in the crucible;
   d) melting a mixture of c) in the crucible;
   e) setting a gap between a bottom of the crucible and the copper rotating wheel between 0.1 and 0.5 mm when a molten material is ejected;
   f) selecting an overpressure on top of the melt used to expel the molten material from the crucible onto the copper wheel between 0.2 and 0.4 atmospheres.

3. The method of claim 1 wherein a composite from a group comprising Sn—Al and Sn—Cu is produced.

4. The method as claimed in claim 1 followed by a cooling step to ambient temperatures.

5. The method as claimed in claim 1 further including dissolving Al in 1 M (aq) KOH solution resulting in a porous Sn structure.

6. The method as claimed in claim 1 wherein;
   a) a spin speed is selected between a surface velocity of between of 28.27 to 42.4 m/s;
   b) a gap between a bottom of the crucible and a copper rotating wheel is selected between 0.25 and 0.4 mm when a molten material is ejected; and
   c) an overpressure on top of a melt used to expel the molten material from the crucible onto the copper wheel between 0.2 and 0.4 atmospheres.

7. The method as claimed in claim 2 comprising:
   a) cold rolling a Sn—Al ribbon to densify the Sn—Al ribbon.

8. The method as claimed in claim 4 comprising
   a) alkaline etching of the Al using potassium hydroxide solution to introduce pores into the Sn ribbon.

9. The method as claimed in claim 8 wherein the ribbon is used as a battery anode in the form of a sheet.

10. The method as claimed in claim 3 wherein the Sn—Al composite comprises Al inclusions of up to 50 atomic percentage.

11. The method as claimed as claim 1 free of binder and conductive additives.

12. The method as claimed in claim 2 comprising Sn with Cu6Sn5 inclusions less than 1 micron or Sn with Al inclusions less than 250 nano meters.

* * * * *